Patented Dec. 15, 1931

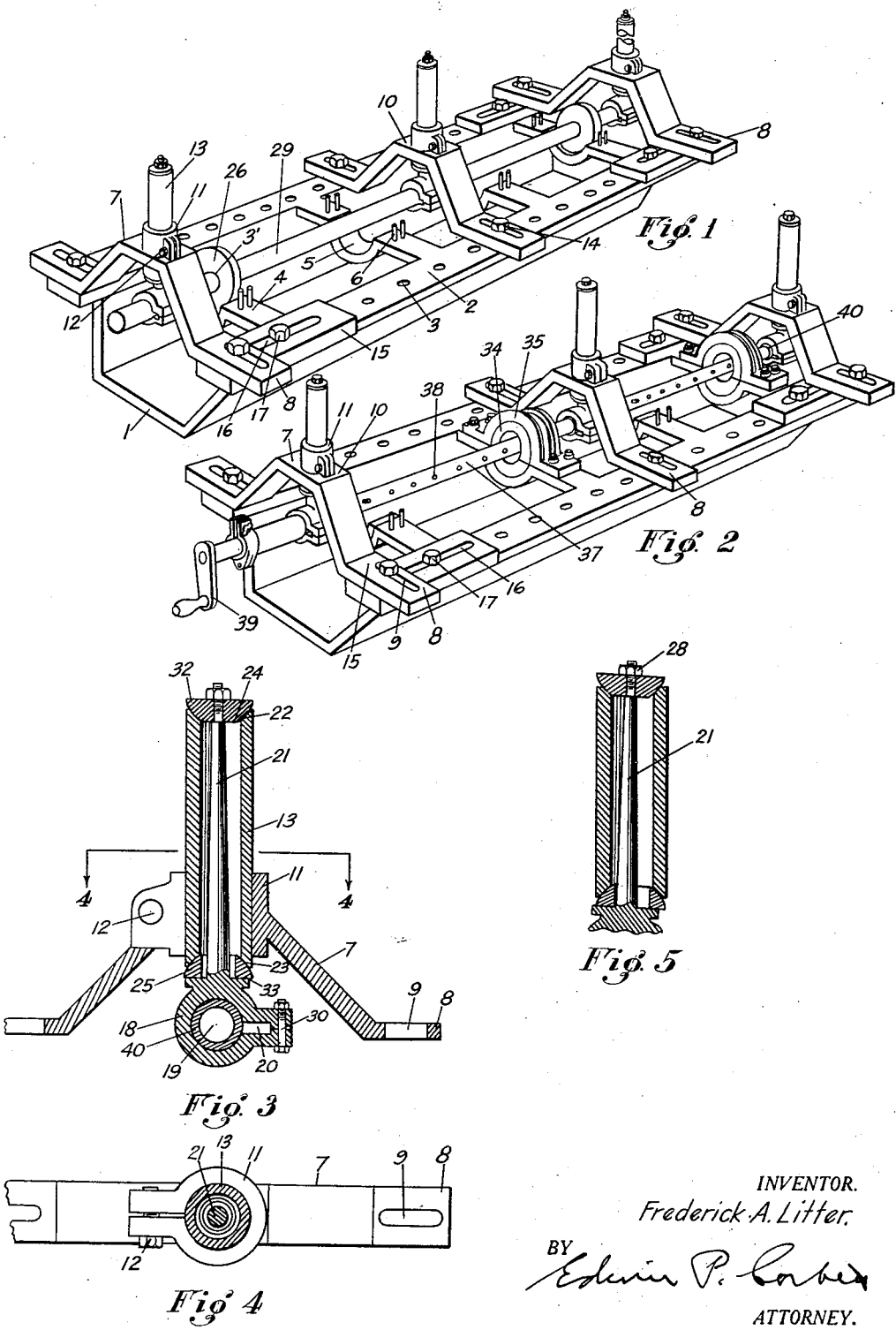

1,836,078

UNITED STATES PATENT OFFICE

FREDERICK A. LITTER, OF COLUMBUS, OHIO

BEARING BORING APPARATUS

Application filed March 31, 1928. Serial No. 266,318.

My invention relates broadly to a bearing boring apparatus and pertains, more particularly, to the provision of an apparatus for boring the main crank-shaft bearings of an automobile engine.

Certain types of apparatus which are at present in use for boring the main bearings of an automobile engine comprise a cutter carrying shaft, bearings for supporting this shaft and bridge pieces adapted to be secured to the engine crank case for supporting the cutter shaft bearings. In apparatus of this type, the arrangement is such that the position and relative alignment of the cutter shaft bearings is finally determined by the position of the bridge pieces which are secured to the crank case. If, as is sometimes the case, the crank case is sprung, or warped or inaccurately machined, the cutter shaft bearings and the cutter shaft will be out of alignment when the bridge pieces are secured to the crank case. This disalignment of the cutter shaft bearings will result in boring disaligned main bearing surfaces and has been the source of much trouble.

A further objectionable feature of the main bearing boring apparatus referred to above is the fact that the cutters must be adjusted after the cutter shaft has been properly positioned with relation to the crank case. This positioning of the cutter shaft makes the necessarily delicate adjustment of the cutter very difficult and inconvenient and, furthermore, increases the danger of boring inaccurate or disaligned bearing surfaces.

My novel main bearing boring apparatus is of such construction that the cutter shaft bearings may be properly aligned with relation to the main bearing saddles and securely held in position during the boring of the main bearings. Also, my invention provides a main bearing boring apparatus in which strain on the cutter shaft bearings and cutter shaft is eliminated and all main bearings bored in accurate alignment irrespective of whether or not the crank case is warped, sprung or inaccurately machined.

The principal object of my invention is to provide a novel apparatus for and method of securing the cutter shaft bearings to the bridge pieces which are attached to the crank case. For this purpose, I employ two portions, each of which corresponds to a segment of a sphere. These segments of a sphere are assembled with a bearing stem and a sleeve, which has concave sockets at its opposite ends and is vertically adjustable with relation to its support. This apparatus will function in such a manner that there will be no strain on the bearing stems regardless of the position of alignment which such bearing stems have with relation to the openings in the bridge pieces when the entire device is assembled in operative relation. In this way I am able to obtain an accurate alignment of the cutter shaft with the main bearings, irrespective of any condition which may exist in the crank case.

Another object of my invention is the provision of an aligning bar or shaft which, in combination with suitable collars, may be employed for aligning the cutter shaft bearings with the main bearing saddles of the crank case prior to the positioning of the main bearing bushings and cutter shaft.

Other important objects of my invention may be seen in the following detailed description and the preferred embodiment of my invention may be seen in the accompanying drawings wherein similar characters of reference designate corresponding parts and wherein:

Figure 1 is a perspective view showing a crank case and the assembly of the cutter shaft bearings and aligning bar with relation to the main bearing saddles.

Figure 2 is a perspective view showing the same crank case as is shown in Figure 1 with the aligning bar replaced by the cutter shaft and the main bearing bushings positioned in the crank case saddles.

Figure 3 is a transverse vertical sectional view showing the assembly of one of the bridge pieces and cutter shaft bearings.

Figure 4 is a sectional view taken on the line 4—4 of Figure 3.

Figure 5 is a transverse vertical sectional view showing the cutter shaft bearing stem in a position in which the stem is not in concentric alignment with the openings in the bridge piece.

In the drawings, the preferred embodiment of my invention is shown in association with the upper half of an automobile crank case which may be generally designated 1. This crank case is only shown diagrammatically and comprises side flanges 2 that are provided with openings 3 which normally serve to receive the bolts used for securing the upper and lower halves of the crank case together. It is also provided with cross members 4 that are formed with semi-cylindrical main bearing bushing saddles 5. Stud bolts 6 for attaching the bearing caps are provided on opposite sides of the bushing saddles. It will be understood that my invention may be used in connection with engines having the upper half of the crank case cast integral with the engine block and that its usefulness is not confined to automobile engines.

With particular reference to Figures 1, 2, 3 and 4, it will be seen that I have provided a plurality of bridge pieces 7. These bridge pieces are susbstantially of inverted V-shape and are, preferably, laterally extending fastening end portions 8 that are provided with slotted openings 9. Relatively flat top portions 10 are connected to the portions 8 by diverging legs. A collar 11, that is split for a portion of its length, forms an integral part of each bridge piece and screw bolts 12 are provided for tightening or loosening the split collar 11 about a hollow shaft 13 to prevent or permit vertical movement of the hollow shaft.

The bridge pieces 7 may be spared apart upon the crank case 1 and are secured in place by means of bolts 14 which engage the openings 3 in the side flanges 2.

If the crank case is too short for the proper spacing of the bridge pieces, additional parts 15 having slots 16 may be secured to the crank case side flanges 2 by means of bolts 17 so that they extend beyond the ends of these flanges. Then the attaching portions of the end bridge pieces may be secured to the projecting ends of these parts.

The cutter shaft bearings 18 are provided with central openings 19, recesses 20 and stems 21. The stems 21 of the cutter shaft bearings fit loosely within the sleeve 13. This shaft sleeve has conical sockets 22 and 23 in its interior at the opposite ends thereof. A portion 24, which takes the form of a washer and has a surface that substantially corresponds to a portion of the surface of a ball whose cross sectional circumferences are perfect circles, is carried on the upper end of the stem 21 and fits snugly in conical socket 22 on the top of the stem 21 in the manner shown in Figures 3 and 5. As also shown in these figures, the stem 21 is preferably tapered. A portion 25 that is similar to the portion 24 has an opening in its center sufficiently large enough to fit over the stem 21 and still have sufficient clearance to permit lateral movement of the portion 25 in any direction with respect to the stem 21. This portion 25 fits into the conical socket 23 of the sleeve 13.

In the assembly of so much of my apparatus as has been thus far discussed, the bridge pieces 7 are secured to the crank case in the manner shown in Figures 1 and 2, the annular collars 26 are placed in the end-bearing saddles 5, the stems 21 of the cutter shaft bearings are positioned within the sleeves 13 which are, at this time, vertically movable within the split collars 11, the portions 24 and 25 are assembled on the stem 21 in the manner shown in Figures 3 and 5 and the nut 28 is placed upon the stem 21 to hold the various parts in assembled relation. At this time, the aligning bar 29 is inserted through the openings 19, and the central openings 31 of the collars 26, the openings 19 being made larger or smaller, as desired, by the bolts 30. It is preferable to use the end main bearing saddles for aligning the cutter shaft bearings to insure that the timing gears will mesh properly when the main bearings have been bored and the crank shaft put in place.

The aligning bar 29, preferably, fits snugly in the openings 19 of the cutter shaft bearing 18 and the central opening 31 of the annular collars 26. When this assembly has been made, the aligning shaft 29 and the cutter shaft bearings 18 will be concentric with the main bearing saddles 5 of the cross pieces 4. The stems 21 of the cutter shaft bearings will, as long as the nuts 28 are loose, be free to assume any position demanded by proper alignment of cutter shaft bearing. This may be necessary to allow correct positioning of the aligning bar 29 and the cutter shaft bearings 18 with relation to the annular collars 26 and the main bearing saddles 5. Vertical movement of the cutter shaft bearings 18 is provided for by the fact that the sleeve 13 is vertically adjustable within the bridge pieces 7. With this construction, it will be clear that the cutter shaft bearings may stand vertically or at an angle to the vertical without affecting the alignment of the cutter shaft or the aligning bar. It will be understood that the annular collars 26 may be of different sizes to fit different engines, and of such relative dimensions that the centers of the cutter shaft bearings will be coincident with the centers of the crank shaft journals. It will be noted that the correct alignment of the aligning bar and the cutter shaft bearing is not affected, in any way, by the position of the bridge pieces or by the condition of the crank case side flanges to which the bridge pieces are secured.

When the bridge pieces 7, aligning bar 29 and the cutter shaft bearing 18 have been assembled, as just described, the portions 24 and 25 will have found a position in which there will be no strain placed upon the cutter shaft bearing stem 21 while the surfaces 32 and 33 of the portions 24 and 25 will remain exactly parallel. This is due to the fact that the surfaces of the portions 24 and 25, which are spherical sections, will be moved about in the concave sockets 22 and 23 of the sleeve 13 to maintain the portions 24 and 25 in parallelism regardless of the angle of the cutter shaft bearing stem 21. After the cutter shaft bearings have reached the position of horizontal adjustment which coincides with the aligning bar, the nuts 28 are tightened to hold the cutter shaft bearing stems and consequently the cutter shaft bearings in such position of adjustment. At this time, the cutter shaft bearings are in their proper position of vertical adjustment whereupon the screw bolt 12 may be tightened to cause the split collar 11 to tighten about the sleeve 13 and prevent vertical movement thereof. It will be obvious that this method of connecting the cutter shaft bearings and bridge pieces has absolutely no tendency to strain any part or in any way disalign the cutter shaft bearing with the main bearing saddles.

The aligning bar 29 may now be slipped out of the bearing 18 and the collars 26 removed from the main bearing saddles 5. The main bearing bushings 34 shown in Figure 2 may now be placed in the bearing saddles and the caps 35 fastened in place by means of the bolts 6 and suitable nuts. For the purpose of illustration, only two bearing caps are shown in position but I prefer to bore all the bearings at the same time. The apparatus is now ready for the insertion of the boring bar or cutter shaft.

The cutter shaft 37, as shown in Figure 2, consists of a bar which is provided with some means, such as the holes 38, for attaching suitable cutters to the bar, and the cutter shaft is assembled with the cutter shaft bearings after the cutters have been attached thereto. In some instances, the cutter shaft is of less diameter than the aligning bar and the openings 19 in the cutter shaft bearing 18. Sleeves 40 may be provided to fit over the cutter shaft to make up for this difference in size. The cutter shaft, because of its smaller size, may be introduced by being positioned eccentrically in the openings 19 of the cutter shaft bearings and the recesses 20 are provided so that the adjusted cutters may pass freely through the cutter shaft bearings. After the cutter shaft is assembled with the cutter shaft bearings the apparatus is ready for the main boring operation.

Some means, such as the handle 39, is provided for turning the cutter shaft and means, not shown, are of a necessity provided for drawing or feeding the cutters through the main bearing as it is turned.

From the preceding description and the drawings attached hereto, it will be apparent that I have provided a novel mechanical apparatus whereby the main bearings of an engine may be bored in accurate alignment and in such a manner that the timing gears of the engine will mesh properly after completion of the boring and positioning of the crank shaft. It will, furthermore, be apparent that I have provided a novel method of aligning the cutter-shaft bearings with the main bearing saddles and for retaining such bearings in correct alignment during the boring of the main bearing bushings. Also, it will be clear that the alignment of the cutter shaft bearings may be made independently of any crank case irregularities and that the cutter shaft, with the cutters adjusted, may be readily assembled with relation to the other parts of the apparatus.

Because of the fact that my apparatus accomplishes an accurate alignment of the cutter shaft bearings with respect to the main bearing saddles and, because of the fact that this alignment may be obtained and maintained irrespective of any defects in the crank case side flanges and without straining any part of the boring apparatus or crank case, I am enabled to bore the main bearings in exact alignment and to accurate dimensions in a minimum length of time.

Having thus described my invention what I claim is:

1. Main bearing boring apparatus comprising a supporting member, a sleeve carried by said member with ball socket surfaces at either end, a cutter shaft bearing, a standard on said bearing extending through said sleeve, a ball member slidably mounted on the top of said standard for cooperation with the upper socket of said sleeve, and a ball member laterally slidable at the lower end of said standard for cooperating with the socket at the lower end of said sleeve and means for locking said ball members and said sleeve against relative adjustment.

2. Main bearing boring apparatus comprising a supporting member, a sleeve carried by said member with ball socket surfaces at either end, a cutter shaft bearing, a standard on said bearing extending through said sleeve, a ball member mounted on the top of said standard for cooperation with the upper socket of said sleeve, said ball member being longitudinally movable with relation to said standard, and a ball member laterally slidable at the lower end of said standard for cooperating with the socket at the lower end of said sleeve and means for locking said ball members and said sleeve against relative adjustment, said sleeve being longitudinally adjustable.

3. Main bearing boring apparatus comprising supporting members, cutter shaft bearings, upstanding stems on said bearing for suspending said cutter shaft bearings on said supporting members, a hollow sleeve enclosing each of said stems, each sleeve having a concave socket at the ends thereof and a segment of a sphere mounted at the upper and lower end of each of said stems, said spheres being adapted to seat in said concave sockets, and means for drawing up on said spherical member to clamp said stems against movement.

4. Main bearing boring apparatus comprising supporting members, cutter shaft bearings, upstanding stems on said bearings for supporting said bearings upon said supporting members, an adjustable ball and socket clamp for clamping said stems against movement, said clamp comprising a bell-mouthed sleeve, semi-spherical members for cooperating with said bell-mouthed portions of said sleeve and means for drawing up on said semi-spherical members.

In testimony whereof I, hereby, affix my signature.

FREDERICK A. LITTER.